United States Patent
Srivastava et al.

(10) Patent No.: US 10,705,895 B2
(45) Date of Patent: Jul. 7, 2020

(54) DEVICE BASED AUTOMATED TOOL INTEGRATION FOR LIFECYCLE MANAGEMENT PLATFORM

(71) Applicant: Accenture Global Solutions Limited, Dublin (IE)

(72) Inventors: Krupa Srivastava, Chennai (IN); Vijayaraghavan Koushik, Chennai (IN); Chandrashekhar Deshpande, Thane (IN); Mark Lazarus, Melbourne (AU); Le G. Dang, Lincolnwood, IL (US); Madhusudhana Desai, Bangalore (IN); Sumit Kute, Mumbai (IN); Arpan Shukla, Ahmedabad (IN); Tiarenla Jamir, Dimapur (IN); Prashant Sawant, Mumbai (IN); Rohan Sharma, Lucknow (IN); Bhaskar Ghosh, Bangalore (IN); Mohan Sekhar, Bangalore (IN); Rajendra T. Prasad, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/456,501

(22) Filed: Jun. 28, 2019

(65) Prior Publication Data

US 2019/0317845 A1 Oct. 17, 2019

Related U.S. Application Data

(63) Continuation of application No. 15/482,379, filed on Apr. 7, 2017, now Pat. No. 10,353,755.

(30) Foreign Application Priority Data

Apr. 12, 2016 (IN) .............................. 201641012824

(51) Int. Cl.
*G06F 9/44* (2018.01)
*G06F 9/54* (2006.01)
(Continued)

(52) U.S. Cl.
CPC ................ *G06F 9/545* (2013.01); *G06F 8/70* (2013.01); *G06F 9/451* (2018.02);
(Continued)

(58) Field of Classification Search
CPC ....................................................... G06F 9/545
(Continued)

(56) References Cited

U.S. PATENT DOCUMENTS 10,353,755 B2 7/2019 Srivastava et al.
2012/0311157 A1* 12/2012 Erickson ................. G06F 9/541
709/226

(Continued)

*Primary Examiner* — Timothy A Mudrick
(74) *Attorney, Agent, or Firm* — Harrity & Harrity, LLP

(57) ABSTRACT

A device may identify a tool operating on a first device for integration into a lifecycle management platform operating on a second device. The tool may be associated with providing a functionality not included in the lifecycle management platform. The first device may be external to the second device. The device may determine a set of tool attributes for data events associated with the tool. The data events may include a data input, a data output, a new message, an updated message, a deleted message, or the like. The device may select a message format based on the set of tool attributes. The device may configure adaptation for a tool application programming interface (API) of the tool and a platform API of the lifecycle management platform based on the message format. The device may provide information associated with configuring adaptation for the tool API and the platform API.

20 Claims, 8 Drawing Sheets

(51) Int. Cl.
  *G06F 9/451*    (2018.01)
  *G06F 8/70*     (2018.01)
  *G06F 9/455*    (2018.01)
  *G06F 8/36*     (2018.01)

(52) U.S. Cl.
  CPC ...... *G06F 9/45504* (2013.01); *G06F 9/45533* (2013.01); *G06F 9/541* (2013.01); *G06F 8/36* (2013.01)

(58) Field of Classification Search
  USPC ........................................................ 719/313
  See application file for complete search history.

(56) References Cited

U.S. PATENT DOCUMENTS

2015/0304240 A1* 10/2015 Mandaleeka ......... G06F 9/5072
                                                      709/226
2016/0180096 A1*  6/2016 Sharma ............... G06F 11/3604
                                                      726/25

* cited by examiner

DEVICE BASED AUTOMATED TOOL INTEGRATION FOR LIFECYCLE MANAGEMENT PLATFORM

RELATED APPLICATION(S)

This application is a continuation of U.S. patent application Ser. No. 15/482,379, filed on Apr. 7, 2017, (now U.S. Pat. No. 10,353,755, which claims priority under 35 U.S.C. § 119 to India Provisional Patent Application No. 201641012824, filed on Apr. 12, 2016, the content of which is incorporated by reference herein in its entirety.

BACKGROUND

A software development project may include activities such as computer programming, documentation, testing, and bug fixing involved in creating and maintaining a software product. In performing software development, various methodologies may be employed, including agile development, which typically emphasizes speed and flexibility through the collaborative effort of self-organizing cross-functional teams. In such a development project, a provider may provide a lifecycle management platform that incorporates applications to assist with and/or automate development, such as agile development applications, application delivery applications, application maintenance applications, or the like.

SUMMARY

According to some possible implementations, a device may include one or more processors. The one or more processors may identify a tool operating on a first device for integration into a lifecycle management platform operating on a second device. The tool may be associated with providing a functionality not included in the lifecycle management platform. The first device may be external to the second device. The one or more processors may determine a set of tool attributes for data events associated with the tool. The data events may include a data input, a data output, a new message, an updated message, a deleted message, or the like. The one or more processors may select a message format based on the set of tool attributes. The one or more processors may configure adaptation for a tool application programming interface (API) of the tool and a platform API of the lifecycle management platform based on the message format. The one or more processors may provide information associated with configuring adaptation for the tool API and the platform API.

According to some possible implementations, a method may include receiving, by a device, a message for adaptation between a first format associated with a tool operating on a first device and a second format associated with a lifecycle management platform operating on a second device. The lifecycle management platform may include a set of functionalities associated with managing resources for a development project. The tool may include a functionality associated with managing resources for the development project that is not included in the set of functionalities. The method may include identifying, by the device, a tool adapter including a set of rules for adapting messages between the first format and the second format. The tool adapter may be stored in an archive of tool adapters. The method may include determining, by the device, whether the message is from a trusted or untrusted source. The method may include selectively performing, by the device, adaptation of the message between the first format and the second format using the set of rules included in the tool adapter to generate an adapted message based on a result of determining whether the message is from a trusted or untrusted source. The message may be adapted when from the untrusted source. The message may be bypassed from adaptation when from the trusted source. The method may include outputting, by the device, the adapted message.

According to some possible implementations, a non-transitory computer-readable medium may store one or more instructions. The one or more instructions, when executed by one or more processors, may cause the one or more processors to identify a tool operating on a first device for integration into a lifecycle management platform operating on a second device. The tool may be associated with providing a functionality not included in the lifecycle management platform. The one or more instructions, when executed by one or more processors, may cause the one or more processors to determine a set of tool attributes for data events associated with the tool. The data events may include a data input, a data output, a new message, an updated message, a deleted message, or the like. The one or more instructions, when executed by one or more processors, may cause the one or more processors to select a message format based on the set of tool attributes. The one or more instructions, when executed by one or more processors, may cause the one or more processors to configure adaptation for a tool application programming interface (API) of the tool and a platform API of the lifecycle management platform based on the message format. The one or more instructions, when executed by one or more processors, may cause the one or more processors to store a tool adapter associated with configuring adaptation for the tool API and the platform API. The one or more instructions, when executed by one or more processors, may cause the one or more processors to receive, after storing the tool adapter, a message. The one or more instructions, when executed by one or more processors, may cause the one or more processors to determine that the message is associated with the tool. The one or more instructions, when executed by one or more processors, may cause the one or more processors to obtain the tool adapter from an adapter archive. The one or more instructions, when executed by one or more processors, may cause the one or more processors to adapt the message, using the tool adapter, to generate an adapted message. The one or more instructions, when executed by one or more processors, may cause the one or more processors to output the adapted message to facilitate communication between the tool and the lifecycle management platform.

DETAILED DESCRIPTION

The following detailed description of example implementations refers to the accompanying drawings. The same reference numbers in different drawings may identify the same or similar elements.

A provider may provide a lifecycle management platform operated in a cloud computing environment to provide end-to-end assistance and/or automation for a development project. However, other tools that are not included in the development project may be useful to integrate, such as defect tracking tools, ticket management tools, or the like.

In such a development project, some tools may be hosted by the provider in a secure portion of a tool integration platform, while other tools may be hosted by a client who uses the lifecycle management platform but wants to also use another application. In this case, the other tools may utilize different data formats than the lifecycle management program. For this reason, integrating the other tools into the lifecycle management program (e.g., to allow the tools of the lifecycle management platform and the other tools to communicate and interoperate) has conventionally required manual coding of interfaces.

Implementations, described herein, provide a tool integration platform that provides automatic adaptation of data formats for a lifecycle management platform and other tools that are to integrate into the lifecycle management platform. In this way, the tool integration platform reduces the time to integrate each tool, thereby improving management of projects, which reduces computing usage by reducing errors, time to resolve errors, effort spent to develop and/or manage a project, or the like, relative to a manual integration approach. Also, as a result, tools need not be cohosted with the tool integration platform because the tool integration platform adapts messages from tools to a format that the lifecycle management platform can use, and maintains security protocols associated with the tool integration platform and/or another computing environment in which other tools are hosted.

Figure 1A:
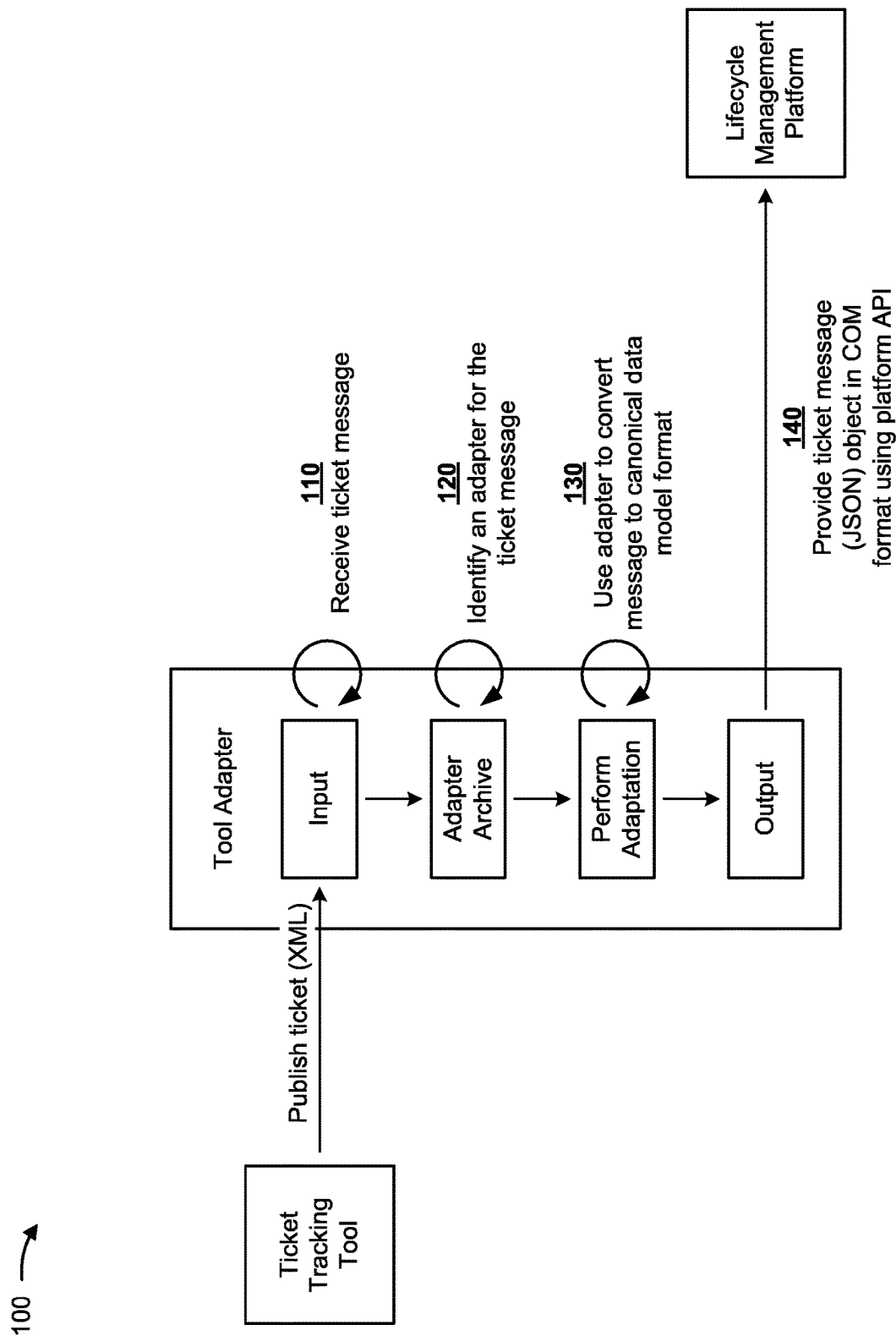
FIGS. 1A and 1B are diagrams of an overview of an example implementation described herein.
Figure 1B:
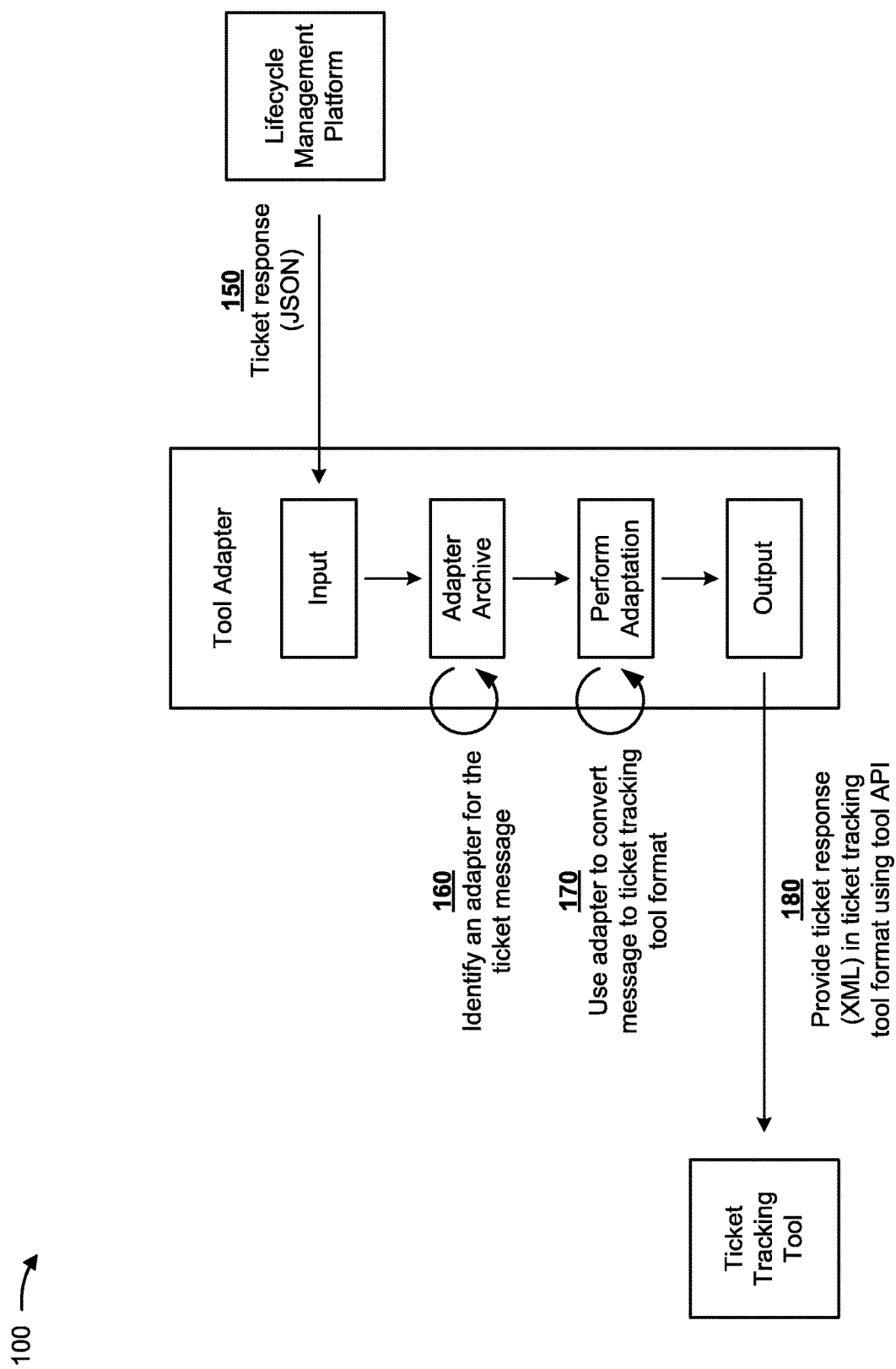

FIGS. 1A and 1B are diagrams of an overview of an example implementation 100 described herein. As shown in FIGS. 1A and 1B, example implementation 100 includes a ticket tracking tool, a tool adapter operated by a tool integration platform, and a lifecycle management platform. A provider may provide the lifecycle management platform, and a client may provide the ticket tracking tool. In some implementations, the tool integration platform may receive a request to adapt the ticket tracking tool for the lifecycle management platform, and may generate a tool adapter. The tool adapter may permit the tool integration platform to integrate the ticket tracking tool into a user interface of the lifecycle management platform to provide seamless use of the ticket tracking tool when using the lifecycle management platform. For example, the tool integration platform may identify a set of data transformations, application programming interface (API) call transformations, user interface element layout transformations, or the like that permit information, functionalities, and/or user interface elements of the ticket tracking tool to be integrated into the lifecycle management platform. In this way, the tool integration platform reduces a quantity of user interfaces to operate and/or to be utilized, and increases security by allowing for a single sign-on.

As shown in FIG. 1A, and by reference number 110, the tool integration platform (e.g., a tool adapter operated by the tool integration platform) may receive a ticket message (e.g., a published ticket in extensible markup language (XML)) from the ticket tracking tool. As shown by reference number 120, the tool integration platform may identify an adapter for the ticket message. For example, the tool adapter may obtain an adaptation tool from an adapter archive of tool adapters based on previously generating and storing the adaptation tool. For example, the tool integration platform may determine that a tool adapter is stored for adapting data associated with the ticket tracking tool to the lifecycle management platform. As shown by reference number 130, the tool integration platform may use the adapter to perform adaptation and convert the message to a canonical data model format. For example, the tool adapter may use the adaptation tool to transform the ticket message to the canonical data model format. In some implementations, the tool adapter may transform a text based message, an API call, a user interface element, or the like into a corresponding text based message, API call, or user interface element of the canonical data format based on a set of adaptation rules of the adaptation tool. As shown by reference number 140, the tool integration platform may output the adapted ticket message. For example, the tool integration platform may generate and output a JavaScript Object Notation (JSON) message object in the canonical data format (a "COM" format) using a platform API.

As shown in FIG. 1B, and by reference number 150, the tool integration platform may receive a ticket response message (e.g., in a JSON format) from the lifecycle management platform. As shown by reference number 160, the tool integration platform may identify an adapter for the ticket response message (e.g., stored in an adapter archive). For example, the tool adapter may determine that an adaptation tool is stored to transform the ticket response message in the JSON format into an XML format of the ticket tracking tool. As shown by reference number 170, the tool integration platform may use the adapter to perform adaptation and convert the message to the ticket tracking tool format. As shown by reference number 180, the tool integration platform may output the adapted ticket message response (e.g., in XML in the ticket tracking tool format using a tool API) to the ticket tracking tool.

Although described herein in terms of a ticket tracking tool, another tool may be integrated into the lifecycle management platform, such as a defect management tool, an agile workflow tool, or the like. In this case, the tool integration platform may generate a tool adapter based on receiving a request to adapt the defect management tool, the agile workflow tool, or the like and may integrate the defect management tool, the agile workflow tool, or the like into a user interface of the lifecycle management platform using a tool adapter.

In this way, the tool integration platform reduces the time to integrate tools into a lifecycle management platform, thereby improving management of projects, which reduces computing usage by reducing errors, time to resolve errors, effort spent to develop and/or manage a project, or the like, relative to a manual integration approach. Also, as a result, tools need not be cohosted with the tool integration platform because the tool integration platform adapts messages from tools to format that the lifecycle management platform can use. This may reduce memory utilization of the tool integration platform and improve data security for the tool integration platform relative to storing all tools for the lifecycle management platform collocated with the lifecycle management platform.

As indicated above, FIGS. 1A and 1B are provided merely as an example. Other examples are possible and may differ from what was described with regard to FIGS. 1A and 1B.

Figure 2A:
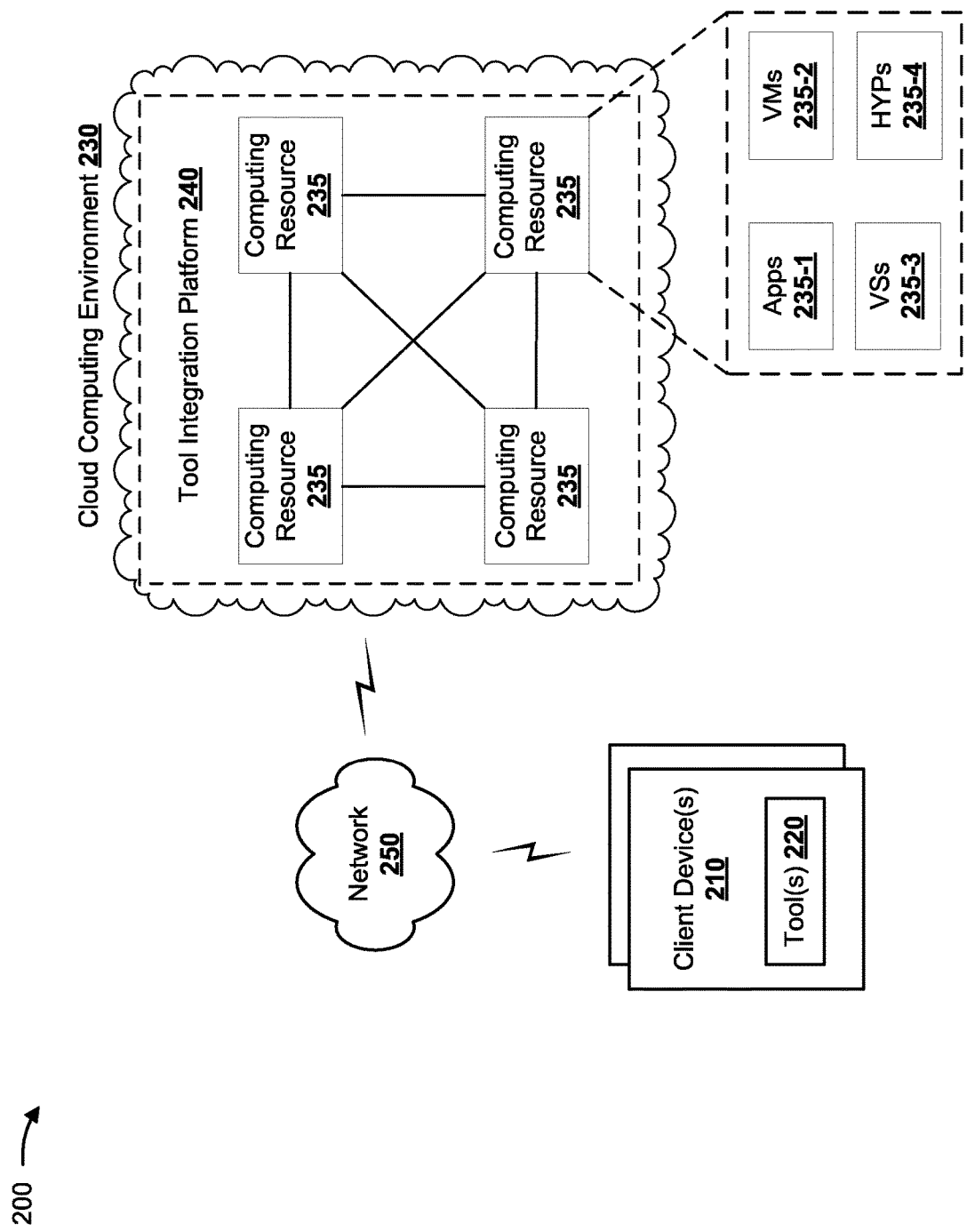
FIG. 2A-2C are diagrams of an example environment in which systems and/or methods, described herein, may be implemented.
Figure 2B:
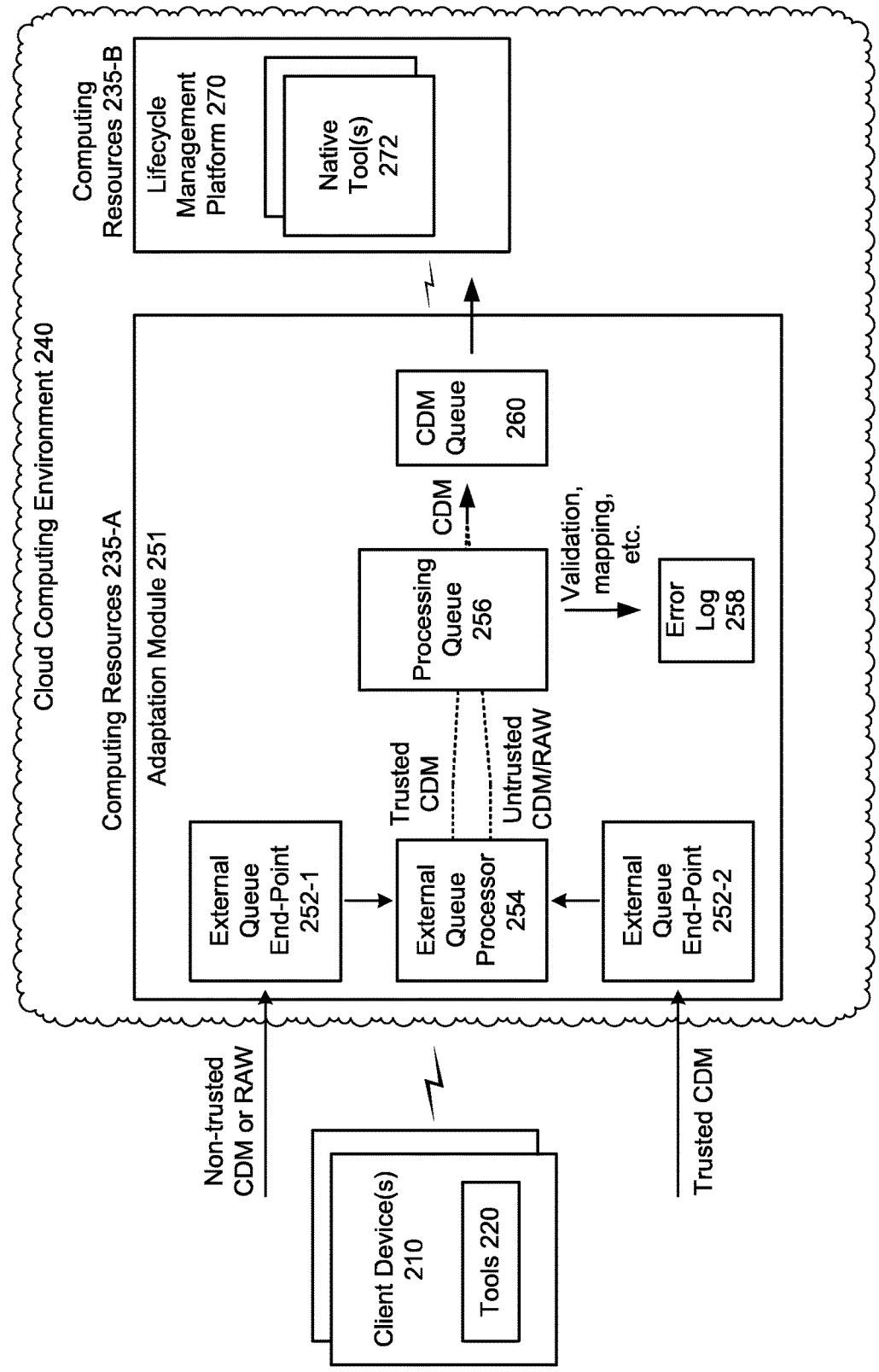
Figure 2C:
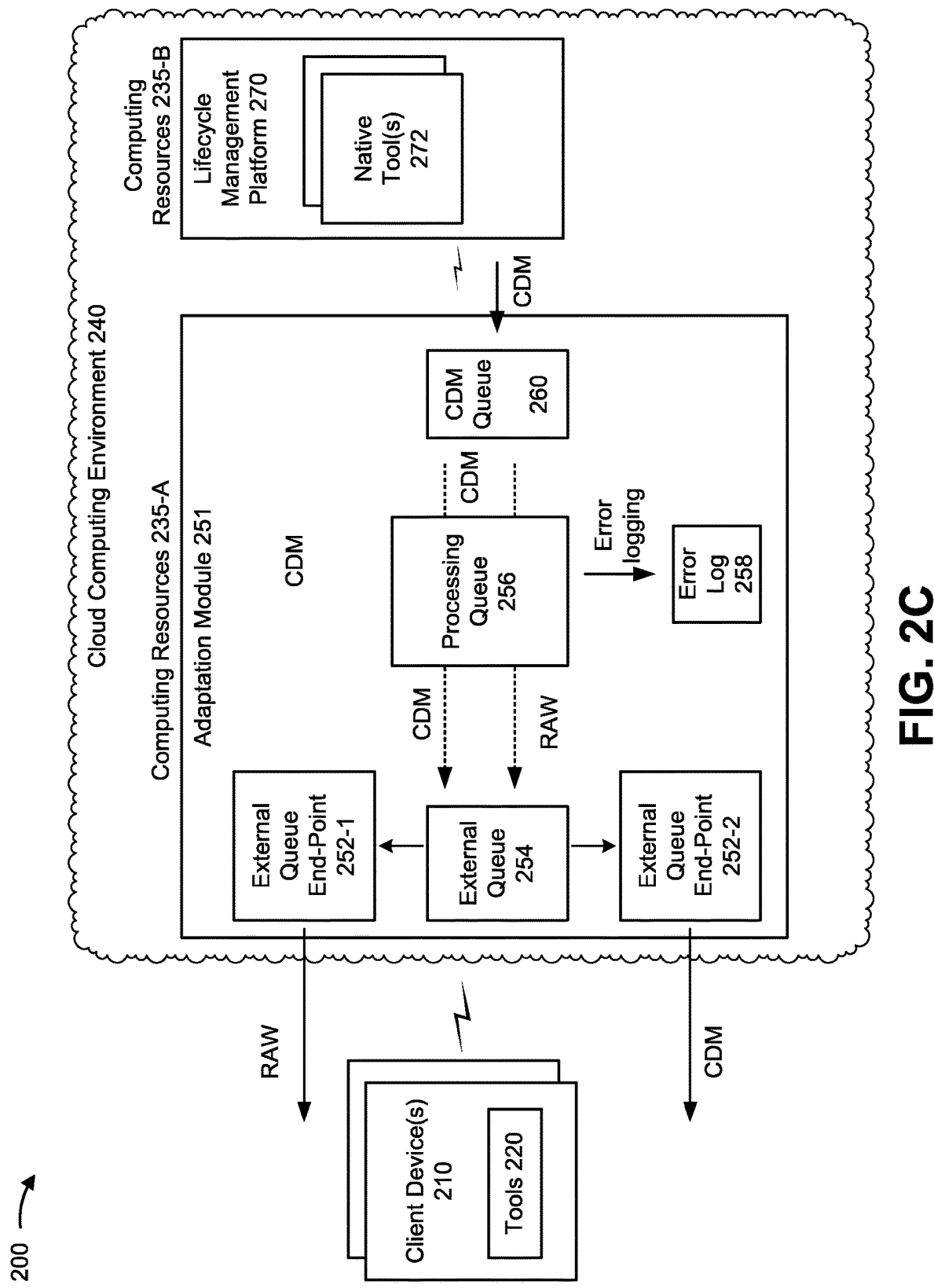

FIGS. 2A-2C are diagrams of an example environment 200 in which systems and/or methods, described herein, may be implemented. As shown in FIGS. 2A, environment 200 may include one or more client devices 210 (hereinafter referred to individually as "client device 210," and collectively as "client devices 210"), which may include a set of tools 220 a cloud computing environment 230, which may include a set of computing resources 235 and which may host a tool integration platform 240, and a network 250.

Client device 210 includes one or more devices capable of receiving, generating, storing, processing, and/or providing information associated with utilization of a lifecycle management platform. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Tool 220 includes one or more tools operated by client device 210 and integrated into a lifecycle management platform using tool integration platform 240. For example, tool 220 may include a ticket tracking tool, a defect management tool, an agile workflow tool, or the like that provides additional functionalities, a different set of functionalities, or the like relative to the lifecycle management platform. In some implementations, tool 220 may be stored by and/or operated by client device 210. In some implementations, tool 220 may be stored by and/or provided (e.g., as software-as-a-service) by a tool integration platform, such as tool integration platform 240 or another tool integration platform. In some implementations, tool 220 corresponds to the ticket tracking tool described herein with regard to FIGS. 1A and 1B.

Cloud computing environment 230 includes an environment that delivers computing as a service, whereby shared resources, services, etc. may be provided to integrate tool 220 into a lifecycle management platform using a tool adapter. Cloud computing environment 230 may provide computation, software, data access, storage, and/or other services that do not require end-user knowledge of a physical location and configuration of a system and/or a device that delivers the services. As shown, cloud computing environment 230 may include tool integration platform 240. In some implementations, cloud computing environment 230 hosts the tool adapter described herein with regard to FIGS. 1A and 1B. In some implementations, cloud computing environment 230 may host the lifecycle management platform. In some implementations, cloud computing environment 230 may communicate with another cloud computing environment 230 that hosts the lifecycle management platform (e.g., via network 250).

Computing resource 235 includes one or more personal computers, workstation computers, server devices, or another type of computation and/or communication device. In some implementations, computing resource 235 may host tool integration platform 240. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by client device 210. Application 235-1 may eliminate a need to install and execute the software applications on client device 210, such as the lifecycle management platform, the tool adapter, or the like. For example, application 235-1 may include software associated with tool integration platform 240 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 205), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

As shown in FIG. 2B, tool integration platform 240 may host, using computing resources 235-A and 235-B, adaptation module 251, which includes one or more external queue end-points 252-1 and 252-2, an external queue processor 254, a processing queue 256 (e.g., a queue, an adapter, etc. to receive data, queue the data for adaptation, adapt the data, etc.), an error log 258, and a canonical data model (CDM) queue 260; and a lifecycle management platform 270, which includes a set of native tools 272 (e.g., tools that comprise the lifecycle management platform 270). Devices of environment 200 may interconnect via wired connections, wireless connections, or a combination of wired and wireless connections.

As further shown in FIG. 2B, non-trusted data in a CDM format (also referred to as a COM format) or a RAW format (e.g., a format associated with a particular tool 220 that is different from the CDM format) may be received by tool integration platform 240 at external queue end-point 252-1. For example, external queue end-point 252-1 may receive data from tools 220 that are not co-located with tool integration platform 240, that are not in a CDM format, that are not co-located in a trusted portion of cloud computing environment 230, or the like. In contrast, external queue end-point 252-2 may receive data that is associated with the CDM format and is directed from a trusted source, such as a source that is co-located with tool integration platform 240 in a trusted portion of cloud computing environment 230. In this case, the data may include information, function calls, API calls, messages, objects, user interface elements, etc. that may be transferred from tool 220 to lifecycle management platform 270. For example, a message dispatcher of lifecycle management platform 270 may provide a message as data to a tool 220 (e.g., which may be adapted to a format compatible with tool 220) to cause an API call to be performed using an API of tool 220, thereby permitting lifecycle management platform 270 to control functionality of tool 220. In some implementations, external queue end-point 252-2 may be provided data via a client API. Data from external queue end-points 252-1 and 252-2 may be provided to external queue processor 254, which may determine a format of the data, a trust value associated with the data (e.g., whether the data is trusted or untrusted), or the like. In some implementations, tool integration platform 240 may provide a synchronous response based on receiving data (e.g., the non-trusted data in the CDM format, the data in the raw format, etc.).

For trusted data in a CDM format, external queue processor 254 may provide the trusted data in the CDM format to CDM queue 260 without adaptation being performed (e.g., the data is already in a format compatible with lifecycle management platform 270). For untrusted data and/or data in a RAW format (e.g., a format of tool 220 that is not the CDM format), external queue processor 254 may provide the untrusted data and/or the data in the RAW format to processing queue 256 for adaptation. Processing queue 256 may be a tool adapter that corresponds to the tool adapter described herein with regard to FIGS. 1A and 1B and may process the untrusted data and/or the data in the RAW format. Although described herein in terms of a particular order of operations performed on data (e.g., data received at external queue processor 254, data received at processing queue 256 (an adapter) for adaptation, etc.), other orders of operations may be possible. For example, an adapter may be located, in a data flow, at a different position, such as at an external queue end-point 252, before an external queue end-point 252, or the like). The tool adapter may perform validation, properties mapping, or the like, on the data to determine that the data is associated with a source that satisfies security criteria associated with lifecycle management platform 270. Additionally, or alternatively, the tool adapter may provide error information to an error log 258. Additionally, or alternatively, the tool adapter may adapt the data into the CDM format, and may provide the adapted data to CDM queue 260. Data may be provided from CDM queue 260 to lifecycle management platform 270 (e.g., using a CDM router), to permit lifecycle management platform 270 to utilize the data. In this way, a data from a tool 220 is integrated into lifecycle management platform 270.

As shown in FIG. 2C, adaptation module 251 may receive, at CDM queue 260 data in a CDM format from lifecycle management platform 270. CDM queue 260 may determine a destination format for the data. For data that is intended for a tool 220 using the CDM format, CDM queue 260 may provide the data to external queue processor 254 for output to client device 210 and tool 220. For data that is intended for a RAW format (e.g., another type of format), CDM queue 260 may provide the data to processing queue 256, which may adapt the data into the RAW format. In some implementations, processing queue 256 may output error information to error log 258. Processing queue 256 may provide the adapted data to external queue processor 254, which may output the CDM data via external queue end-point 252-2 and the RAW data via external queue end-point 252-1. Although described herein in terms of a particular data flow, other data flows may be possible. For example, data may be received at another queue (e.g., external queue end-point 252, provided to external queue processor 254, processing queue 256, and/or the like to export data generated by lifecycle management platform 270.

The number and arrangement of devices and networks shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) of environment 200 may perform one or more functions described as being performed by another set of devices of environment 200.

Figure 3:
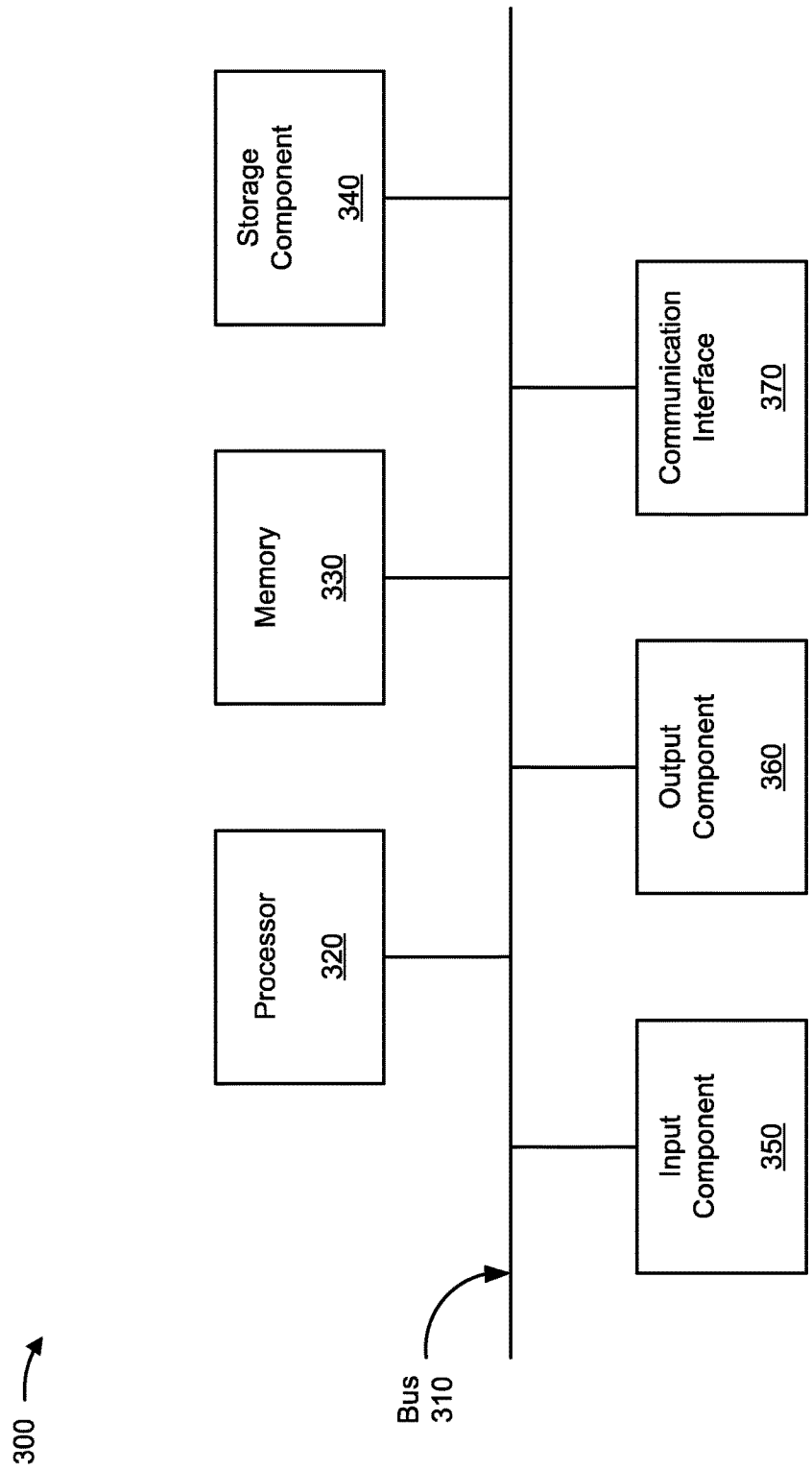
FIG. 3 is a diagram of example components of one or more devices of FIG. 2.

FIG. 3 is a diagram of example components of a device 300. Device 300 may correspond to client device 210, computing resource 235, and/or tool integration platform 240. In some implementations, client device 210, computing resource 235, and/or tool integration platform 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
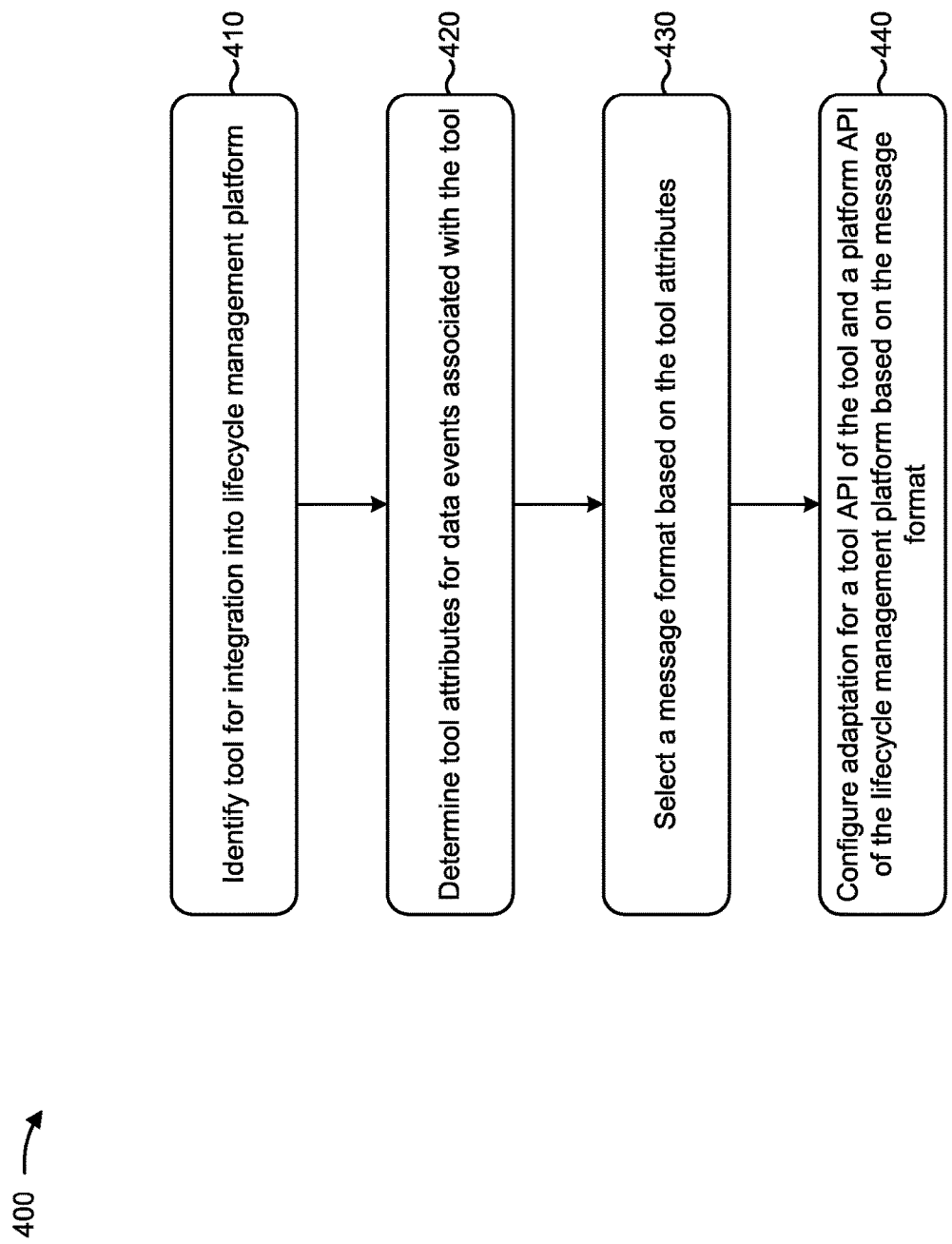
FIG. 4 is a flow chart of an example process for configuring tool adaptation.

FIG. 4 is a flow chart of an example process 400 for configuring tool adaptation. In some implementations, one or more process blocks of FIG. 4 may be performed by tool integration platform 240. In some implementations, one or more process blocks of FIG. 4 may be performed by another device or a group of devices separate from or including tool integration platform 240, such as client device 210.

As shown in FIG. 4, process 400 may include identifying a tool for integration into lifecycle management platform (block 410). For example, tool integration platform 240 may identify tool 220 for integration into lifecycle management platform 270.

In some implementations, tool 220 may include a ticket management tool, a defect management tool, or the like. In some implementations, tool integration platform 240 may receive information identifying tool 220 from client device 210 (e.g., based on a client providing input to client device 210 to indicate that tool 220 is to be integrated, based on monitoring for a new tool release from a tool developer, etc.). In some implementations, tool integration platform 240 may monitor client device 210 to identify a new tool 220 installed on client device 210, an upgrade to a tool 220 installed on client device 210, a downgrade to a tool 220 installed on client device 210, or the like. For example, tool integration platform 240 may scan client device 210 to determine a status of tools 220 associated with or previously associated with client device 210. In some implementations, tool integration platform 240 may store a tool profile identifying a set of tools 220 associated with a particular client device 210. In this case, when tool integration platform 240 detects another client device 210 associated with a common corporate network, a common Internet protocol address, a common geographic location, a common user, etc. with the particular client device 210, tool integration platform 240 may identify a set of tools of the other client device 210 based on the tool profile of the particular client device 210.

In some implementations, tool integration platform 240 may search an adapter archive to determine that an adapter has not already been created for tool 220. If tool integration platform 240 identifies a version of an older tool, such as where tool 220 is a new release, tool integration platform 240 may automatically operate tool 220 to generate data for an older adapter to determine whether the older adapter works for the new tool. In this case, tool integration platform 240 may reconfigure an existing adapter rather than configuring a new adapter. In this way, tool integration platform 240 may reduce adapter generation time, processing utilization, memory, etc., relative to configuring a new adapter. In some implementations, tool integration platform 240 may provide a user interface to permit a user to locate an adapter in an adapter archive. In this case, tool integration platform 240 may utilize machine learning trained based on user use of the user interface to train the machine learning to locate adapters in the adapter archive, thereby reducing a time to train the machine learning relative to another technique that does not train based on user use.

In some implementations, tool integration platform 240 may identify tool 220 based on determining a functionality of lifecycle management platform 270, such as application delivery services functionalities, application maintenance services functionalities, agile delivery services functionalities, or the like. For example, tool integration platform 240 may determine that lifecycle management platform 270 does not include a ticket tracking functionality, and may determine to generate a tool adapter for use in a development project that is to include ticket tracking. Application delivery services may include release management, requirement management, deliverable/receivable management, defect management, test management, work request management, risk management, and/or issue management. As another example, application maintenance services may include work request management, risk management, issue management, incident ticket management, service request ticket management, and/or problem ticket management. As another example, agile delivery services may include risk management, issue management, story management, iteration management, task management, and/or impediment management.

As further shown in FIG. 4, process 400 may include determining tool attributes for data events associated with the tool (block 420). For example, tool integration platform 240 may determine tool attributes for data events associated with tool 220.

In some implementations, the data events may include a data input, a data output, a new message, an updated message, a deleted message, or the like. In some implementations, tool integration platform 240 may determine capabilities of tool 220 (e.g., what messages are generated, when messages are generated, the format(s) of the generated messages, etc.), functions of tool 220, and/or identifiers associated with tool 220 (e.g., identifiers of projects in tools, such as may be mapped to identifiers or projects in lifecycle management platform 270). In some implementations, tool integration platform 240 may receive information associated with capabilities of tool 220, such as based on user use of a user interface generated by tool integration platform 240.

In some implementations, tool integration platform 240 may automatically run tool 220 to determine tool attributes. For example, tool integration platform 240 may communicate with client device 210 to simulate operation of tool 220 to determine the set of data events, a data format, a header format, or the like.

In some implementations, tool integration platform 240 may determine security requirements associated with tool 220 and the lifecycle management platform 270. For example, tool integration platform 240 may determine whether tool 220 is operated at a client site, such as a client data center. As another example, tool integration platform 240 may determine whether tool 220 is operated in the provider cloud that hosts lifecycle management platform 270 and/or whether tool 220 is authorized or non-authorized. In this case, if tool integration platform 240 determines tool 220 is operated in the provider cloud and is authorized, tool integration platform 240 may determine that no further authentication is needed. In contrast, tool integration platform 240 may determine that authentication is required to verify that the message is from tool 220 and not associated with a malicious or erroneous purpose (e.g., such as where the message appears to be from tool 220, but is not from tool 220). In this way, tool integration platform 240 ensures security for lifecycle management platform 270 to avoid errors being introduced into a development project that is managed using lifecycle management platform 270.

In some implementations, tool integration platform 240 may determine that tool attribute criteria (e.g., required attributes) are satisfied. For example, tool integration platform 240 may determine that messages are transmitted in a particular description format (e.g., JSON, or XML).

In some implementations, tool integration platform 240 may determine that certain attributes are satisfied for each API function of tool 220 that is to link to an API function of the lifecycle management platform 270. In some implementations, tool integration platform 240 may determine types of criteria that may relate to usage in lifecycle management platform 270. For example, tool integration platform 240 may determine defect management criteria for defect management tools, ticket management criteria for ticket tools, or the like.

In some implementations, tool integration platform 240 may permit certain attribute values for certain attributes. For example, tool integration platform 240 may determine that a particular data format associated with tool 220 for integration allows a particular set of tool values for the certain attribute, such as, in the case of a defect management tool (e.g., permitted values include a critical value and a non-critical value). In this case, tool integration platform 240 may determine that the lifecycle management platform 270 is configured to classify information using a different set of lifecycle management platform values (e.g., permitted values include a red value, a yellow value, and a green value), and may generate a set of adaptation rules to convert between the sets of values (e.g., a red value being equivalent to a critical value and a yellow value and green value being equivalent to a non-critical value). In some implementations, tool integration platform 240 may utilize a machine learning technique to analyze a set of conversions (e.g., a training set of red, yellow, and green values that have already been converted to critical and non-critical attributes), and may generate a rule for adapting values based on applying the machine learning technique to a training set. In some implementations, the machine learning technique may include a pattern recognition technique, a cognitive processing technique, a heuristic technique, or the like. In some implementations, a user may provide, via a user interface generated by tool integration platform 240, information identifying the set of conversions. In this case, the machine learning technique may be trained based on the information provided by the user to reduce a time to train the machine learning technique.

In some implementations, tool integration platform 240 may associate header formats with a pre-defined format readable by tool integration platform 240. Otherwise, tool integration platform 240 may generate another layer of adaptation to adapt header formats. For example, tool integration platform 240 may generate a layer of adaptation (e.g., a set of rules of a tool adapter) for adapting header information that accompanies a data event between a format that is usable by tool 220 and a format that is usable by lifecycle management platform 270. In this case, one or more of the adaptation rules may relate to rearranging an ordering of data elements of a header from a first ordering to a second ordering.

As further shown in FIG. 4, process 400 may include selecting a message format based on the tool attributes (block 430). For example, tool integration platform 240 may select a message format based on the tool attributes.

In some implementations, tool integration platform 240 may determine the message format for tool 220 based on the tool attributes. In some implementations, tool integration platform 240 may select XML, JSON, or another description language for transferring a message to lifecycle management platform 270. In some implementations, tool integration platform 240 may select the message format based on a type of information that is provided by tool 220.

As further shown in FIG. 4, process 400 may include configuring adaptation for a tool API of the tool and a platform API of the lifecycle management platform based on the message format (block 440). For example, tool integration platform 240 may configure adaptation for a tool API of tool 220 and a platform API of lifecycle management platform 270.

In some implementations, tool integration platform 240 may establish mapping of API functions between the tool API and the platform API to permit lifecycle management platform 270 to control tool 220, to perform seamless single login for both tool 220 and lifecycle management platform 270, or the like. In some implementations, tool integration platform 240 may establish data mapping of data included in tool messages to a canonical data model format that can be used by lifecycle management platform 270.

In some implementations, tool integration platform 240 may configure a user interface to integrate tool APIs. In this case, tool integration platform 240 may map user interface functions of tool 220 to pre-defined user interface layouts of lifecycle management platform 270 (e.g., stored in a data structure).

In some implementations, tool integration platform 240 may establish identifier mapping of tool identifiers to lifecycle management platform 270 identifiers. For example, tool integration platform 240 may utilize pattern recognition, machine learning, heuristics, etc., to identify a same project in tool 220 and lifecycle management platform 270, and to map identifiers. In this case, tool integration platform 240 may also use a project name, source, client, user, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
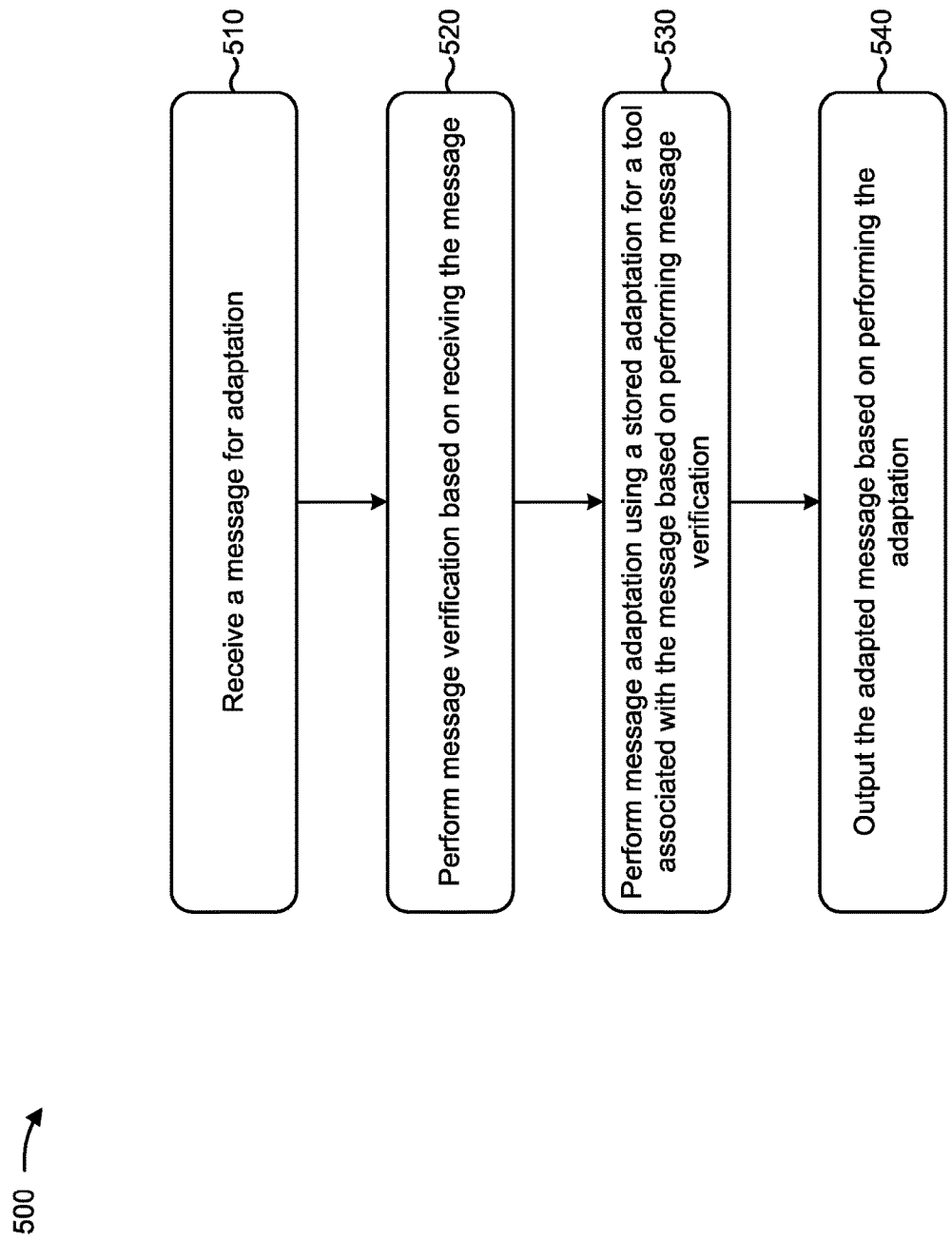
FIG. 5 is a flow chart of an example process for performing tool adaptation for a tool.

FIG. 5 is a flow chart of an example process 500 for performing tool adaptation for a tool. In some implementations, one or more process blocks of FIG. 5 may be performed by tool integration platform 240. In some implementations, one or more process blocks of FIG. 5 may be performed by another device or a group of devices separate from or including tool integration platform 240, such as client device 210.

As shown in FIG. 5, process 500 may include receiving a message for adaptation (block 510). For example, tool integration platform 240 may receive a message for adaptation.

In some implementations, tool integration platform 240 may receive the message based on tool 220 publishing the message. For example, a tool API may encapsulate payload data as a message in RAW format (e.g., a tool specific format), and may provide the message to tool integration platform 240 in the raw format, such as in a JSON object, XML object, etc., and tool integration platform 240 may receive the message. In some implementations, a tool API may export the message (e.g., a document identifying multiple defects in a CSV format, a Microsoft Excel file format, or the like). In this case, tool integration platform 240 may extract each defect message from the document sequentially, concurrently, or the like.

In some implementations, tool integration platform 240 may receive the message based on lifecycle management platform 270 publishing the message. In some implementations, tool integration platform 240 may receive the message based on exposing an interface of tool integration platform 240. For example, tool integration platform 240 may expose the interface of tool integration platform 240 over a secure connection (e.g., a proxy connection, an HTTPS connection, etc.) to permit tool 220 to publish a message to a message queue (e.g., an IBM MQ message queue) for adaptation. In some implementations, tool integration platform 240 may provide a synchronous response to indicate a receipt of the message. As an example, tool 220 may publish a defect message in RAW format.

As further shown in FIG. 5, process 500 may include performing message verification based on receiving the message (block 520). For example, tool integration platform 240 may perform message verification based on receiving the message.

In some implementations, tool integration platform 240 may determine a format of a message. In this case, if tool integration platform 240 determines the message is already in a canonical data model format and directed to lifecycle management platform 270, tool integration platform 240 may pass the message to lifecycle management platform 270 without adaptation. Otherwise, if tool integration platform 240 determines the message is in a canonical data model format but not from an authorized source (e.g., a tool 220 within tool integration platform 240), then tool integration platform 240 may perform authentication. Otherwise, if tool integration platform 240 determines the message is in a non-canonical data format, then tool integration platform 240 may perform authentication.

In some implementations, tool integration platform 240 may perform verification based on a security policy. For example, tool integration platform 240 may perform the message verification based on a message source, a message type, a security token included with the message, project details, a message identifier, or the like. In this case, tool integration platform 240 may log authentication failures, and may automatically transmit a notification to an administrator, to a user, or the like.

In some implementations, tool integration platform 240 may verify that a defect message is from an authorized source to publish a defect for a particular project. For example, tool integration platform 240 may verify an Internet Protocol (IP) address as corresponding to the authorized source, a network identifier as corresponding to the authorized source, a user name and password as corresponding to the authorized source, or the like.

As further shown in FIG. 5, process 500 may include performing message adaptation using a stored adaptation for a tool associated with the message based on performing message verification (block 530). For example, tool integration platform 240 may perform message adaptation using a stored adaptation for tool 220 associated with the message based on performing message verification.

In some implementations, tool integration platform 240 may obtain the adaptation tool from an archive of adaptation tools. In some implementations, tool integration platform 240 may transform the message using an adaptation tool. In this case, when the message is directed to lifecycle management platform 270, tool integration platform 240 may transform the message to canonical data format. Otherwise, when the message is directed to tool 220, tool integration platform 240 may transform the message to a RAW format of tool 220. As an example, tool integration platform 240 may determine whether a defect message is in a RAW format or a CDM format, if the defect message is in a CDM format whether the defect message is trusted or untrusted, and based on the determinations (e.g., that the defect message is in the RAW format, is untrusted in the CDM format, etc.) may utilize a stored adaptation tool to transform a defect message in a raw format to a canonical data format for lifecycle management platform 270.

As further shown in FIG. 5, process 500 may include outputting the adapted message based on performing adaptation (block 540). For example, tool integration platform 240 may output the adapted message based on performing the adaptation.

In some implementations, tool integration platform 240 may output the message using an API (e.g., an API of lifecycle management platform 270 to output the message to lifecycle management platform 270, an API of tool 220 to output the message to tool 220, etc.) In this case, systems may be subscribed to an adaptation tool, and may receive the message as a result of the message being converted. For example, a portion of lifecycle management platform 270 that manages defects may subscribe to adaptation tools for integrating defect management tools to receive a message relating to defects when a defect management tool publishes a message.

As a particular example, tool integration platform 240 may provide a defect to lifecycle management platform 270 for storage, processing, or the like. In this case, tool integration platform 240 may send a success message back to tool 220 to indicate success in providing the adapted message to the lifecycle management platform 270. Subsequently, lifecycle management platform 270 may process the defect message, resolve the defect using functionalities of the lifecycle management platform 270, and provide a message to tool 220 indicating resolution.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein provide tool integration platform 240 that provides automatic adaptation of data formats for lifecycle management platform 270 and other tools 220 that are to integrate into lifecycle management platform 270. In this way, tool integration platform 240 reduces the time to integrate each tool 220, thereby improving management of projects, which reduces computing usage by reducing errors, time to resolve errors, effort spent to develop/manage a project, and so forth, relative to a manual integration approach. Also, as a result, tools 220 need not be cohosted with tool integration platform 240 because tool integration platform 240 adapts messages from tools 220 to a format that lifecycle management platform 270 can use.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   receiving, by a first device, a message from a second device;
   identifying, by the first device, a first adapter for the message;
   using, by the first device, the first adapter to convert the message to a first particular format;
   outputting, by the first device, an adapted message to a third device,
      the adapted message being the message converted to the first particular format;
   receiving, by the first device, from the third device, and based on outputting the adapted message, a response message;
   identifying, by the first device, a second adapter for the response message;
   using, by the first device, the second adapter to convert the response message to a second particular format; and
   outputting, by the first device via an application programming interface (API) of the second device, an adapted response message to the second device,
      the adapted response message being the response message converted to the second particular format.

2. The method of claim 1, further comprising:
   exposing an interface of the first device; and
   wherein receiving the message from the second device comprises:
      receiving, based on exposing the interface, the message from the second device.

3. The method of claim 1, further comprising:
   performing a verification of the message based on receiving the message from the second device; and
   wherein using the first adapter to convert the message comprises:
      using, based on performing the verification of the message, the first adapter to convert the message.

4. The method of claim 3, wherein performing the verification of the message comprises:

performing the verification of the message based on at least one of:
a source of the message,
a type of the message,
a security token included in the message,
project details associated with the message, or
an identifier of the message.

5. The method of claim 1, wherein the message is a defect message; and
wherein the method further comprises:
verifying that the defect message is from an authorized source to publish a defect; and
wherein using the first adapter to convert the message comprises:
using, based on verifying that the defect message is from the authorized source, the first adapter to convert the defect message.

6. The method of claim 5, wherein verifying that the defect message is from the authorized source comprises:
verifying at least one of:
an Internet Protocol (IP) address corresponding to the authorized source,
a network identifier corresponding to the authorized source,
a user name corresponding to the authorized source, or
a password corresponding to the authorized source.

7. The method of claim 1, wherein the message comprises data encapsulated by the API.

8. A first device, comprising:
one or more memories; and
one or more processors communicatively coupled to the one or more memories, configured to:
receive a message from a second device;
identify a first adapter for the message;
use the first adapter to convert the message to a first particular format;
output an adapted message to a third device,
the adapted message being the message converted to the first particular format;
receive, from the third device and based on outputting the adapted message, a response message;
identify a second adapter for the response message;
use the second adapter to convert the response message to a second particular format; and
output an adapted response message to the second device,
the adapted response message being the response message converted to the second particular format, and
the adapted response message being received, by the second device, via an application programming interface (API) of the second device.

9. The first device of claim 8, wherein the one or more processors are further configured to:
expose an interface of the first device; and
wherein the one or more processors, when receiving the message from the second device, are configured to:
receive, based on exposing the interface, the message from the second device.

10. The first device of claim 8, wherein the one or more processors are further configured to:
perform a verification of the message based on receiving the message from the second device; and
wherein the one or more processors, when using the first adapter to convert the message, are configured to:
use, based on performing the verification of the message, the first adapter to convert the message.

11. The first device of claim 10, wherein the one or more processors, when performing the verification of the message, are configured to:
perform the verification of the message based on at least one of:
a source of the message,
a type of the message,
a security token included in the message,
project details associated with the message, or
an identifier of the message.

12. The first device of claim 8, wherein the message is a defect message; and
wherein the one or more processors further configured to:
verify that the defect message is from an authorized source to publish a defect; and
wherein the one or more processors, when using the first adapter to convert the message, are configured to:
use, based on verifying that the defect message is from the authorized source, the first adapter to convert the defect message.

13. The first device of claim 12, wherein the one or more processors, when verifying that the defect message is from the authorized source, are configured to:
verify at least one of:
an Internet Protocol (IP) address corresponding to the authorized source,
a network identifier corresponding to the authorized source,
a user name corresponding to the authorized source, or
a password corresponding to the authorized source.

14. The first device of claim 8, wherein the message comprises on data encapsulated by the API.

15. A non-transitory computer-readable medium storing instructions, the instructions comprising:
one or more instructions that, when executed by one or more processors of a first device, cause the one or more processors to:
receive a message from a second device;
identify a first adapter for the message;
use the first adapter to convert the message to a first particular format;
output an adapted message to a third device,
the adapted message being the message converted to the first particular format;
receive, from the third device, and based on outputting the adapted message, a response message;
identify a second adapter for the response message;
use the second adapter to convert the response message to a second particular format; and
output an adapted response message to the second device,
the adapted response message being the response message converted to the second particular format, and
the adapted response message being received, by the second device, via an application programming interface (API) of the second device.

16. The non-transitory computer-readable medium of claim 15, wherein the one or more instructions, when executed by the one or more processors, further cause the one or more processors to:
expose an interface of the first device; and
wherein the one or more instructions, that cause the one or more processors to receive the message from the second device, cause the one or more processors to:
receive, based on exposing the interface, the message from the second device.

17. The non-transitory computer-readable medium of claim 15, wherein the one or more instructions, when executed by the one or more processors, further cause the one or more processors to:
    perform a verification of the message based on receiving the message from the second device; and
    wherein the one or more instructions, that cause the one or more processors to use the first adapter to convert the message, cause the one or more processors to:
        use, based on performing the verification of the message, the first adapter to convert the message.

18. The non-transitory computer-readable medium of claim 17, wherein the one or more instructions, that cause the one or more processors to perform the verification of the message, cause the one or more processors to:
    perform the verification of the message based on at least one of:
        a source of the message,
        a type of the message,
        a security token included in the message,
        project details associated with the message, or
        an identifier of the message.

19. The non-transitory computer-readable medium of claim 15, wherein the message is a defect message; and
    wherein the one or more instructions, when executed by the one or more processors, cause the one or more processors to:
        verify that the defect message is from an authorized source to publish a defect; and
    wherein the one or more instructions, that cause the one or more processors to use the first adapter to convert the message, cause the one or more processors to:
        use, based on verifying that the defect message is from the authorized source, the first adapter to convert the defect message.

20. The non-transitory computer-readable medium of claim 19, wherein the one or more instructions, that cause the one or more processors to verify that the defect message is from the authorized source, cause the one or more processors to:
    verify at least one of:
        an Internet Protocol (IP) address corresponding to the authorized source,
        a network identifier corresponding to the authorized source,
        a user name corresponding to the authorized source, or
        a password corresponding to the authorized source.

\* \* \* \* \*